(12) United States Patent
Markov et al.

(10) Patent No.: US 8,001,032 B2
(45) Date of Patent: *Aug. 16, 2011

(54) SYSTEM AND METHOD TO SOLVE DYNAMIC MULTI-FACTOR MODELS IN FINANCE

(75) Inventors: Michael Markov, Short Hills, NJ (US); Vadim Mottl, Tula (RU); Ilya Muchnik, Brookline, MA (US)

(73) Assignee: Markov Processes International, LLC, Summit, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/614,987

(22) Filed: Nov. 9, 2009

(65) Prior Publication Data

US 2010/0057638 A1 Mar. 4, 2010

Related U.S. Application Data

(63) Continuation of application No. 10/431,838, filed on May 7, 2003, now Pat. No. 7,617,142.

(60) Provisional application No. 60/378,562, filed on May 7, 2002.

(51) Int. Cl.
*G06Q 40/00* (2006.01)

(52) U.S. Cl. .............. 705/36 R; 705/35; 705/37; 705/38

(58) Field of Classification Search .................... 705/35, 705/36 R, 37

See application file for complete search history.

(56) References Cited

U.S. PATENT DOCUMENTS

2003/0078867 A1* 4/2003 Scott et al. ...................... 705/36

OTHER PUBLICATIONS

Risk aversion and stock price sensitivity to dividends May Hagiwara, Miguel A Herce. The American Economic Review. Nashville: Sep. 1997. vol. 87, Iss. 4; p. 738 (8 pages).*

Measurement error in the cost of equity of U.S. industries Bala Arshanapalli, William Nelson. American Business Review. West Haven: Jun 1999. vol. 17, Iss. 2; p. 119 (7 pages).*

A New Test of the Three-Moment Capital Asset Pricing Model Lim, Kian-Guan. Journal of Financial and Quantitative Analysis. Seattle: Jun. 1989. vol. 24, Iss. 2; p. 205 (12 pages).*

* cited by examiner

*Primary Examiner* — Lalita M Hamilton
(74) *Attorney, Agent, or Firm* — Fay Kaplun & Marcin, LLP

(57) ABSTRACT

Methods and systems for estimating time-varying factor exposures of either an individual financial instrument or a portfolio of such instruments, through the solution of a constrained multi-criteria dynamic optimization problem, providing an estimation error function and one or more transition error functions to be minimized over a period of time. The factor exposures relay the influence of the factors on the return of the instrument or portfolio. The estimation error function provides the estimation error at each time interval between the return of the asset collection and a sum of products of each factor exposure and its respective factor. Each transition error function provides a transition error of each factor exposure between time intervals. In one embodiment, the constraints can include a budget constraint and non-negativity bounds applying to some or all of the factor exposures. In other embodiments, the method and system can be applied to estimating any time-varying weight that is used in a model, to relay the influence of one or more independent variables on a dependent financial or economic variable, through the solution of a constrained multi-criteria dynamic problem, minimizing estimation error and transition error terms. In other embodiments, the solution of a multi-criteria dynamic problem can be used as part of a method and system to determine structural breakpoints for each factor, and also as part of a method and system for determining optimal parameters to weight the transition error functions and selecting the factors included in the model.

21 Claims, No Drawings

SYSTEM AND METHOD TO SOLVE DYNAMIC MULTI-FACTOR MODELS IN FINANCE

PRIORITY CLAIM

The present application is a Continuation application of U.S. patent application Ser. No. 10/431,838 filed on May 7, 2003 entitled "Method and System to Solve Dynamic Multi-Factor Models in Finance" now U.S. Pat. No. 7,617,142 issued on Nov. 10, 2009 which claims priority to U.S. Provisional Patent Application Ser. No. 60/378,562 filed on May 7, 2002, the entire disclosure of both applications are expressly incorporated herein by reference.

FIELD OF THE INVENTION

The present invention relates generally to systems and methods for estimating time-varying factor exposures in financial or economic model or problem, through the solution of a multi-factor dynamic optimization of the model or problem, while meeting the constraints for the estimated time-varying factor exposures in the model or problem.

BACKGROUND OF THE INVENTION

The following references, discussed and/or cited in this application, are hereby expressly incorporated herein by reference in their entirety into this application;
1. Sharpe, William F., *Capital asset prices: A theory of market equilibrium under conditions of risk. Journal of Finance*, September 1964;
2. Chen, Nai-fu, Roll, Richard, Ross, Stephen A., *Economic forces and the stock market. Journal of Business*, 59, Jul. 1986;
3. Rosenberg, B., *Choosing a multiple factor model. Investment Management Review*, November/December 1987;
4. Sharpe, William F., *Determining a Fund's Effective Asset Mix. Investment Management Review*, November/December 1988;
5. Sharpe, William F., *Asset Allocation: Management Style and Performance Measurement. The Journal of Portfolio Management*, Winter 1992;
6. Kalaba, R., Tesfatsion, L., *Time-Varying Linear Regression via Flexible Least Squares. Computers and Mathematics with Applications*, 17, 1989;
7. Kalaba, R., Tesfatsion, L., *Flexible least squares for approximately linear systems. IEEE Transactions on Systems, Man, and Cybernetics*, SMC-5, 1990;
8. Tesfatsion, L., *GFLS implementation in FORTRAN and the algorithm.* http://www.econ.iastate.edu/tesfatsi/gflshelp.htm (1997);
9. Lütkepohl, H., Herwartz, H., *Specification of varying coefficient time series models via generalized flexible least squares*. Journal of Econometrics, 70, 1996;
10. Wright, S., *Primal-dual interior-point methods, SIAM,* 1997; and
11. Stone, M., *Cross-validatory choice and assessment of statistical predictions. Journal of Royal Statistical Soc.*, B 36, 1974.

A. Multi-Factor Models in Finance

Factor models are well known in finance, among them a multi-index Capital Asset Prices Model (CAPM) and Arbitrage Pricing Theory (APT). These models allow for a large number of factors that can influence securities returns.

The multi-factor CAPM, for example, described in Sharpe, William F., *Capital asset prices: A theory of market equilibrium under conditions of risk. Journal of Finance*, September 1964, pp. 425-442, can be represented by the equation:

$$r - r^{(f)} \cong \alpha + \beta^{(1)}(r^{(1)} - r^{(f)}) + \beta^{(2)}(r^{(2)} - r^{(f)}) + \ldots + \beta^{(n)}(r^{(n)} - r^{(f)}) \quad (1)$$

where r is the investment return (security or portfolio of securities), $r^{(i)}$ are returns on the market portfolio as well as changes in other factors like inflation, and $r^{(f)}$ is return on a risk-free instrument.

In the multi-factor APT model (described, for example, in Chen, N., Richard R., Stephen A. R., *Economic forces and the stock market. Journal of Business*, 59, July 1986, pp. 383-403):

$$r \cong \alpha + \beta^{(1)} I^{(1)} + \beta^{(2)} I^{(2)} + \ldots + \beta^{(n)} I^{(n)} \quad (2)$$

the factors $I^{(i)}$ are typically chosen to be the major economic factors that influence security returns, like industrial production, inflation, interest rates, business cycle, etc. (described, for example, in Chen, N., Richard R., Stephen A. R., *Economic forces and the stock market. Journal of Business*, 59, July 1986, pp. 383-403, and in Rosenberg, B., *Choosing a multiple factor model. Investment Management Review*, November/December 1987, pp. 28-35).

Coefficients $\beta^{(1)}, \ldots, \beta^{(n)}$ in the CAPM (1) and APT (2) models are called factor exposures. Along with the constant $\alpha$, the factor exposures make the vector of model parameters $(\alpha, \beta^{(1)}, \ldots, \beta^{(n)})$, which is typically estimated by applying a linear regression technique to the time series of security/portfolio returns $r_t$ and economic factors $r_t^{(i)}$ or $I_t^{(i)}$ over a certain estimation window $t=1, \ldots, N$:

$$(\hat{\alpha}, \hat{\beta}^{(1)}, \ldots, \hat{\beta}^{(n)}) = \arg\min_{\alpha, \beta^{(1)}, \ldots, \beta^{(n)}} \sum_{t=1}^{N} (r_t - \alpha - \beta^{(1)} I_t^{(1)} - \ldots - \beta^{(n)} I_t^{(n)})^2. \quad (3)$$

One of the most effective multi-factor models for analyses of investment portfolios, called the Returns Based Style Analysis (RBSA), was suggested by Prof. William F. Sharpe (for example, in Sharpe, William F., *Determining a Fund's Effective Asset Mix. Investment Management Review*, November/December 1988, pp. 59-69, and in Sharpe, William F., *Asset Allocation: Management Style and Performance Measurement. The Journal of Portfolio Management*, Winter 1992, pp. 7-19). In the RBSA model, the periodic return y of a portfolio consisting of n kinds of assets is approximately represented by a linear combination of single factors $(x^{(1)}, \ldots, x^{(n)})$ whose role is played by periodic returns of generic market indices for the respective classes of assets. To enhance the quality of parameter estimation, a set of linear constraints is added to the basic equation:

$$y \cong \alpha + \beta^{(1)} x^{(1)} + \beta^{(2)} x^{(2)} + \ldots + \beta^{(n)} x^{(n)}, \quad (4)$$

$$\sum_{i=1}^{n} \beta^{(i)} = 1, \beta^{(i)} \geq 0, i = 1, \ldots, n.$$

In such a model, $x^{(i)}$, $i=1, \ldots, n$, represent periodic returns (for example, daily, weekly or monthly) of generic market indices such as bonds, equities, economic sectors, country indices, currencies, etc. For example (as described in Sharpe, William F., *Asset Allocation: Management Style and Performance Measurement. The Journal of Portfolio Management*, Winter 1992, pp. 7-19), twelve such generic asset indices are used to represent possible areas of investment.

To estimate the parameters of equation (4), Sharpe used the Constrained Least Squares Technique, i.e., the parameters are found by solving the constrained quadratic optimization problem in a window of t=1, ..., N time periods in contrast to the unconstrained one (3):

$$\begin{cases} (\hat{\alpha}, \hat{\beta}^{(1)}, \ldots, \hat{\beta}^{(n)}) = \arg\min_{\alpha, \beta^{(1)}, \ldots, \beta^{(n)}} \sum_{t=1}^{N} (y_t - \alpha - \beta^{(1)} x_t^{(1)} - \ldots - \beta^{(n)} x_t^{(n)})^2, \\ \text{subject to } \sum_{i=1}^{n} \beta^{(i)} = 1, \beta^{(i)} \geq 0, i = 1, \ldots, n. \end{cases} \quad (5)$$

Model parameters $(\alpha, \beta^{(1)}, \ldots, \beta^{(n)})$ estimated using unconstrained (3) and constrained least squares techniques (5) represent average factor exposures in the estimation window—time interval t=1, ..., N. However, the factor exposures typically change in time. For example, an active trading of a portfolio of securities can lead to significant changes in its exposures to market indices within the interval. Detecting such dynamic changes, even though they happened in the past, represents a very important task.

In order to estimate dynamic changes in factor exposures, a moving window technique is typically applied. For example, in RBSA model (4), the exposures at any moment of time t are determined on the basis of solving (5) using a window of K portfolio returns [t−(K−1), ..., t] and the returns on asset class indices over the same time period (as described, for example, in 5. Sharpe, William F., *Asset Allocation: Management Style and Performance Measurement. The Journal of Portfolio Management*, Winter 1992, pp. 7-19):

$$\begin{cases} (\hat{\alpha}_t, \hat{\beta}_t^{(1)}, \ldots, \hat{\beta}_t^{(n)}) = \arg\min_{\alpha, \beta^{(1)}, \ldots, \beta^{(n)}} \sum_{\tau=0}^{K-1} (y_{t-\tau} - \alpha - \beta^{(1)} x_{t-\tau}^{(1)} - \ldots - \beta^{(n)} x_{t-\tau}^{(n)})^2, \\ \text{subject to } \sum_{i=1}^{n} \beta^{(i)} = 1, \beta^{(i)} \geq 0, i = 1, \ldots, n, \end{cases} \quad (6)$$

By moving such estimation window forward period by period, dynamic changes in factor exposures can be approximately estimated.

The moving window technique described above has its limitations and deficiencies. The problem setup assumes that exposures are constant within the window, yet it is used to estimate their changes. Reliable estimates of model parameters can be obtained only if the window is sufficiently large which makes it impossible to sense changes that occurred within a day or a month, and, therefore, such technique can be applied only in cases where parameters do not show marked changes within it: $(\alpha_s, \beta_s^{(1)}, \ldots, \beta_s^{(n)}) \approx \text{const}, t-(K-1) \leq s \leq t$. In addition, such approach fails to identify very quick, abrupt changes in investment portfolio exposures that can occur due to trading.

In situations, where detecting dynamic exposures represents an important task, the widow technique is inadequate, and a fundamentally new approach to estimating multi-factor models with changing properties are required. It is just the intent of this patent to fill in this gap.

B. The Dynamic RBSA Model

The multi-factor RBSA model (4), as well as the CAPM (1) and APT ones (2), are, in their essence, linear regression models with constant regression coefficients $(\alpha, \beta^{(1)}, \ldots, \beta^{(n)})$.

In order to monitor a portfolio for quick changes in investment allocation or investment style, deviations from investment mandate, etc., a dynamic regression RBSA model is needed to represent the time series of portfolio returns $y_t$ as dynamically changing linear combination of a finite number n of time series of basic factors $x_t = (x_t^{(1)}, \ldots, x_t^{(n)})^T$ with unknown real-valued factor exposures $\beta_t = (\beta_t^{(1)}, \ldots, \beta_t^{(n)})^T$ and an unknown auxiliary term $\alpha_t$. However, in the RBSA model, both the factor exposures and the intercepts are subject to appropriate constraints $(\alpha_t, \beta_t) \in Z$, in the simplest case, the linear ones $$\sum_{i=1}^{n} \beta_t^{(i)} = 1, \beta_t^{(i)} \geq 0.$$

$$\begin{cases} y_t = \alpha_t + \sum_{i=1}^{n} \beta_t^{(i)} x_t^{(i)} + e_t = \alpha_t + \beta_t^T x_t + e_t, \\ (\alpha_t, \beta_t) \in Z, \end{cases} \quad (7)$$

where $e_t$ is the residual model inaccuracy treated as white noise.

Note that unlike (5) and (6), the model (7) assumes that factor exposures are changing in every period or time interval t. The present invention specifies constraints $(\alpha_t, \beta_t) \in Z$ adequate to most typical problems of financial management, and describes a general way of estimating dynamic multi-factor models under those constraints.

C. Insufficiency of Existing Methods of Estimating Dynamic Linear Models i. Flexible Least Squares (FLS)

A method of unconstrained parameter estimation in dynamic linear regression models was suggested by Kalaba and Tesfatsion under the name of Flexible Least Squares (FLS) method, as described, for example, in Kalaba, R., Tesfatsion, L., *Time-Varying Linear Regression via Flexible Least Squares. Computers and Mathematics with Applications*, 17, 1989, pp. 1215-1245, in Kalaba, R., Tesfatsion, L., *Flexible least squares for approximately linear systems. IEEE Transactions on Systems, Man, and Cybernetics*, SMC-5, 1990, 978-989, and in Tesfatsion, L., *GFLS implementation in FORTRAN and the algorithm*, at http://www.econ.iastate.edu/tesfatsi/gflshelp.htm (1997). To estimate the succession of unknown n-dimensional regression coefficient vectors $(\beta_t, t=1, \ldots, N)$ under the assumption that $(y_t, t=1, \ldots, N)$ and $(x_t, t=1, \ldots, N)$ are known time series, it was proposed to minimize the quadratic objective function $$(\hat{\beta}_t, t=1, \ldots, N) = \quad (8)$$

$$\arg\min_{\beta_t, t=1, \ldots, N} \left[ \sum_{t=1}^{N} (y_t - x_t^T \beta_t)^2 + \lambda \sum_{t=2}^{N} (\beta_t - V\beta_{t-1})^T U(\beta_t - V\beta_{t-1}) \right],$$

where V and U are known (n×n) matrices, where matrix V expresses the assumed linear transition model of the hidden dynamics of time-varying regression coefficients, and matrix $\lambda U$, $\lambda > 0$, is responsible for the desired smoothness of the sought-for succession of estimates ($\hat{\beta}_t$, t=1, ..., N). In practice, the transition matrix V is considered to be the identity matrix.

The structure of the criterion (8) explicitly displays the essence of the FLS approach to the problem of parameter estimation in dynamic linear regression models as a multi-objective optimization problem. The first term is the squared Euclidean norm of the linear regression residuals $\|e_{[1,...,N]}\|$, $e_t = y_t - x_t^T \beta_t$, responsible for the model fit, the second term is a specific squared Euclidean norm of the variation of model parameters $\|w_{[2,...,N]}\|$, $w_t = (\beta_t - V\beta_{t-1})^T U(\beta_t - V\beta_{t-1})$, which is determined by the choice of the positive semidefinite matrix U, whereas the positive weighting coefficient $\lambda$ is to be chosen to balance the relative weights between these two particular objective functions. If $\lambda \to \infty$, the solution of (8) becomes very smooth and approaches the ordinary least squares solution, while selecting $\lambda$ close to zero makes the parameters very volatile. Typically, the equation (8) is solved and presented for different values of parameter $\lambda$.

ii. Generalized Flexible Least Squares (GFLS)

A generalization of the FLS method was suggested by Lütkepohl and Herwartz under the name of Generalized Flexible Least Squares (GFLS) method, for example, in Lütkepohl, H., Herwartz, H., *Specification of varying coefficient time series models via generalized flexible least squares*. Journal of Econometrics, 70, 1996, pp. 261-290), and presented as follows:

$$\begin{cases} (\hat{\beta}_t, t=1, ..., N) = \\ \arg\min_{\beta_t, t=1,...,N} \left[ \sum_{t=1}^{N} (y_t - x_t^T \beta_t)^2 + \lambda_1 \sum_{t=k+1}^{N} (\beta_t - \tilde{\beta}_{1,t})^T U_1 (\beta_t - \tilde{\beta}_{1,t}) + \lambda_2 \sum_{t=s+1}^{N} (\beta_t - \tilde{\beta}_{2,t})^T U_2 (\beta_t - \tilde{\beta}_{2,t}) \right], \\ \tilde{\beta}_{1,t} = V_{1,1} \beta_{t-1} + ... + V_{1,k} \beta_{t-k}, \\ \tilde{\beta}_{2,t} = V_2 \beta_{t-s}. \end{cases} \quad (9)$$

In this specific version of the multi-objective criterion, two different norms of the model parameter variation are fused, namely, the norm based on a higher-order model of parameter dynamics $\|w_{1,[k+1,...,N]}\|$, $w_{1,t} = (\beta_t - \tilde{\beta}_{1,t})^T U_1 (\beta_t - \tilde{\beta}_{1,t})$, and that representing the variation at a single predefined value of the time lag $\|w_{2,[s+1,...,N]}\|$, $w_{2,t} = (\beta_t - \tilde{\beta}_{2,t})^T U_2 (\beta_t - \tilde{\beta}_{2,t})$. Each of these norms is defined by the choice of the respective positive semidefinite matrix, respectively, $U_1$ and $U_2$.

Algorithms for solving the FLS (8) and GFLS (9) problems were described, for example, in Tesfatsion, L., *GFLS implementation in FORTRAN and the algorithm*. http://www.econ.iastate.edu/tesfatsi/gflshelp.htm (1997), and in Lütkepohl, H., Herwartz, H., *Specification of varying coefficient time series models via generalized flexible least squares*. Journal of Econometrics, 70, 1996, pp. 261-290.

However, the FLS and GFLS methods discussed above, never mention, suggest or otherwise describe methods or systems for estimating dynamic multi-factor models adequate for financial applications, first of all, because of the presence of constraints $(\alpha_1, \beta_1) \in Z$ in the RBSA model (7) and other financial or economic models or problems. The methods also do not mention, suggest or otherwise describe methods or systems for determining structural breakpoints with a multi-factor dynamic optimization problem or determining cross validation statistics to formulate the model or problem.

The present invention provides methods and systems for resolving these and other issues arising in financial or economic applications.

SUMMARY OF INVENTION

The present invention provides methods and systems for estimating time-varying factor exposures in models or problems, such as, for example, in the RBSA model and other financial and economic models or problems, through a multi-factor dynamic optimization of the models or problems, while meeting the constraints for the estimated time-varying factor exposures.

One embodiment of the present invention describes a method of estimating time-varying weights (for example, factor exposures) for independent variables (such as, e.g., factors or indexes) at each time interval in a period of time, through a dynamic optimization of a model relating an influence of one or more independent variables on a dependent economic variable. The method includes the steps of: receiving data related to the dependent economic variable for all the time intervals, receiving data related to the independent variables for all the time intervals, and, determining at least one weight for one independent variable at each time interval, that minimizes values of two or more objective functions while meeting at least one constraint on possible values for the weight. The constraints and objective functions are formulated as part of the model. Each of the weights relays the influence of their respective independent variables on the dependent economic variable. One objective function represents an estimation error between the dependent economic variable and a predicted dependent economic variable at each time interval. The predicted dependent economic variable is determined at each time interval as a function of the weight of each independent variable and its respective independent variable. The model includes one or more other objective functions representing a transition error of each weight between time intervals.

Another embodiment of the present invention describes a method of estimating time-varying weights (for example, factor exposures) for independent variables (such as, e.g., factors or indexes) at each time interval in a period of time, through a dynamic optimization of a model relating an influence of one or more independent variables on a dependent financial variable. The method includes the steps of: receiving data related to the dependent financial variable for the plurality of time intervals, receiving data related to the at least one independent variable for the plurality of time intervals, and determining at least one weight for its respective independent variable at each time interval, that minimizes values of two or more objective functions while meeting at least one constraint on possible values for the weight. The constraints and objective functions are formulated as part of the model. Each of the weights relays the influence of their respective independent variables on the dependent financial variable. One objective function represents an estimation error between the dependent financial variable and a predicted dependent financial variable at each time interval. The predicted dependent financial variable is determined at each time interval as a function of the weight of each independent variable and its respective independent variable. The model includes one or more other objective functions representing a transition error of each weight between time intervals.

In another additional embodiment of the present invention, a method of estimating time-varying factor exposures at each time interval in a period of time, through a dynamic optimization of a model relating an influence of at least one factor on a return of an asset collection, includes the steps of: receiving data related to the return of the asset collection for the plurality of time intervals, receiving data related to the at least one factor for the plurality of time intervals; and determining one or more factor exposures for their respective factors at each of the time intervals, that minimizes a value of an objective function while meeting at least one constraint on possible values for one or more of the factor exposures. The asset collection includes one or more assets, and can be, for example, a single security or a portfolio of securities, such as a mutual fund. Each of the factor exposures relays the influence of its respective factor (e.g., a return or price of a security, or a financial or economic index) on the return of the asset collection. The objective function includes an estimation error term, and one or more transition error terms. The estimation error term represents an estimation error at each time interval between the return of the asset collection and a sum of products of each factor exposure and its respective factor. Each transition error term represents a transition error at each time interval after a first time interval for each factor exposure between the time interval and a prior time interval.

In another additional embodiment of the present invention, a method of estimating time-varying factor exposures at each time interval in a period of time, through a dynamic optimization of a model relating an influence of at least one factor on a return of an asset collection, includes the steps of: receiving data related to the return of the asset collection for all of the time intervals, receiving data related to each factor for all of the time intervals, and determine one or more factor exposures at each time interval, that minimizes a value of an objective function while meeting one or more constraints on possible values for one or more factor exposure. The asset collection includes one or more assets, and can be, for example, a single security or a portfolio of securities, such as a mutual fund. Each of the factor exposures relays the influence of its respective factor (e.g., a return or price of a security, or a financial or economic index) on the return of the asset collection. The objective function includes an estimation error term and one or more transition error terms. The estimation error term represents an estimation error at each time interval between the return of the asset collection and a sum of products of each factor exposure and its respective factor. Each transition error term represents a transition error at each time interval before a last time interval, for each of the at least one factor exposure between the time interval and a subsequent time interval.

Another additional embodiment of the present invention sets forth a method for determining structural breakpoints for one or more factors influencing the return of an asset collection over a period of time made up of a plurality of time intervals. As described more fully below, the structural breakpoint can identify a change, for example, in the management of a mutual fund, or a reaction to a sudden event, e.g., an unscheduled announcement by the Federal Reserve that it is lowering interest rates. The asset collection includes one or more assets. The asset collection can refer to, for example, a single security, or a portfolio of securities, such as a mutual fund. The method includes the steps of: receiving data related to the return of the asset collection for the plurality of time intervals, receiving data related to each factor for the plurality of time intervals, determining one or more factor exposures for each of their respective factors at each time interval, that minimizes a value of a function including an estimation error term and one or more transition error terms, and determining structural breakpoint ratios for one or more factor exposures in order to determine their structural breakpoints. Each factor exposure relays the influence of a respective factor on the return of the asset collection. The minimized function can be formulated as a parameter weighted sum. The parameter-weighted sum is a sum of a quadratic norm of the estimation error term and one or more parameter-weighted quadratic norms of transition error terms. The estimation error term represents an estimation error at each time interval between the return of the asset collection and a sum of products of each of the at least one factor exposure and its respective factor. Each transition error term represents transition error at each time interval after a first time interval for each factor exposure between the time interval and a prior time interval. The structural breakpoint ratio is determined at each time interval, as a ratio of a minimum of the parameter-weighted sum over all the time intervals to a minimum of a modified parameter-weighted sum. The modified parameter-weighted sum can be formulated as a sum of a quadratic norm of the estimation error term and a parameter-weighted quadratic norm of the at least one transition error term over all the time intervals. The modified parameter-weighted sum excludes at least part of a transition error term representing a transition error of the factor exposure between the time interval and a prior time interval.

Another additional embodiment of the present invention sets forth a method of configuring a model relating factor exposures for each of one or more factors and their respective factors on a return of an asset collection over a period of time. The period of time includes a plurality of time intervals. The asset collection includes one or more assets, and as set forth above, can be a single security or a portfolio. The method includes the steps of: receiving data related to an actual return of the asset collection for the plurality of time intervals, receiving data related to each factor for the plurality of time intervals, creating a reduced dataset for each particular time interval (identified as a tested time interval) excluding the data related to the actual return of the asset collection at the tested time interval, and determining with each reduced dataset, for each tested time interval, a predicted return of the asset collection as a function of a set of predicted factor exposures and their respective factors, and determining a cross validation statistic over the period of time, as a function of a difference between the actual return of the asset collection and the predicted return of the asset collection at each time interval. The predicted factor exposures relay a predicted influence of a respective factor on the actual return of the asset collection. The set of predicted factor exposures for each tested time interval, are determined with the reduced dataset, by determining, at each time interval, the predicted factor exposures minimizing a sum of a quadratic norm of an estimation error term and at least one parameter-weighted transition error term. The estimation error term, for a set of predicted factor exposures at a tested time interval, represents an estimation error at each time interval, except for the tested time interval, between the actual return of the asset collection and a sum of products of each predicted factor exposure and its respective factor. Each of the transition error terms, for a set of predicted factor exposures at a tested time interval, represents a transition error at each time interval after a first time interval for each of the at least one factor exposure between the time interval and a prior time interval.

Another additional embodiment of the present invention sets forth a method for evaluating a performance of an asset collection over a period of time, for example, for evaluating the management style of a fund manager. The asset collection includes one or more assets, as set forth above in other embodiments. The period of time includes a plurality of time intervals. The method includes the step of receiving information relating an influence of each factor in a set including at least one factor on a return of the asset collection at each time interval. The influence of each factor is determined as a function of the factor exposures of each respective factor. One of more of the factor exposures determined at each time interval minimizes a value of an objective function while meeting at least one constraint on possible values for one or more of the factor exposures. The objective function includes an estimation error term and one or more transition error terms. The estimation error term represents an estimation error at each time interval between the return of the asset collection and a sum of products of each of the at least one factor exposure and its respective factor. Each transition error term represents a transition error at each time interval after a first time interval in the period of time, for each factor exposure between the time interval and a prior time interval.

Another additional embodiment of the present invention sets forth a method for evaluating a performance of an asset collection over a period of time. The asset collection includes one or more assets. The period of time includes a plurality of time intervals. The method includes the step of providing information relating an investment style of a manager of the asset collection as a function of information relating an influence of each factor in a set including at least one factor on a return of the asset collection at each time interval. The influence of each factor is determined as a function of the factor exposures of each respective factor, at least one factor exposure being determined at each time interval that minimizes a value of an objective function while meeting at least one constraint on possible values for the factor exposures. The objective function includes an estimation error term and one or more transition error terms. The estimation error term represents an estimation error at each time interval between the return of the asset collection and a sum of products of each factor exposure and its respective factor. Each transition error term represents a transition error at each time interval after a first time interval in the period of time, for each factor exposure between the time interval and a prior time interval.

Another additional embodiment sets forth a computer system for estimating time-varying factor exposures at each time interval in a period of time, through a dynamic optimization of a model relating an influence of at least one factor on a return of an asset collection. The computer system includes one or more processors configured to: receive data related to the return of the asset collection for the plurality of time intervals, the asset collection including at least one asset; receive data related to the at least one factor for the plurality of time intervals, and for each of the plurality of time intervals, determine at least one factor exposure minimizing a value of an objective function while meeting at least one constraint on possible values for the at least one factor exposure. Each of the at least one factor exposures relays the influence of a respective factor on the return of the asset collection. The objective function includes an estimation error term and one or more transition error terms. The estimation error term represents an estimation error at each time interval between the return of the asset collection and a sum of products of each of the at least one factor exposure and its respective factor. Each transition error term represents a transition error at each time interval after a first time interval for each of the at least one factor exposure between the time interval and a prior time interval.

Another additional embodiment sets forth a computer system for evaluating a performance of an asset collection over a period of time. The asset collection includes one or more assets. The period of time includes a plurality of time intervals. The computer system includes at least one processor configured to receive information relating an investment style of a manager of the asset collection as a function of an influence of each factor in a set including at least one factor on a return of the asset collection at each time interval. The influence of each factor is determined as a function of the factor exposures of each respective factor. One or more of the factor exposures are determined at each time interval, that minimize a value of an objective function while meeting at least one constraint on possible values for one or more of the factor exposures. The objective function includes an estimation error term and one or more transition error terms. The estimation error term represents an estimation error at each time interval between the return of the asset collection and a sum of products of each of the at least one factor exposure and its respective factor. Each of the transition error terms represent a transition error at each time interval after a first time interval in the period of time, for each factor exposure between the time interval and a prior time interval.

Another additional embodiment of the present invention sets forth a computer program product for use with a system evaluating a performance of an asset collection. The computer program product includes computer usable medium having computer readable program code embodied in the medium for causing a computer to: receive data related to the return of the asset collection for the plurality of time intervals, receive data related to each factor for the plurality of time intervals, and for each of the plurality of time intervals, determine at least one factor exposure minimizing a value of an objective function while meeting at least one constraint on possible values for the factor exposures. The asset collection includes one or more assets, as set forth above. Each factor exposure relays the influence of its respective factor on the return of the asset collection. The objective function includes an estimation error term and one or more transition error terms. The estimation error term represents an estimation error at each time interval between the return of the asset collection and a sum of products of each of the at least one factor exposure and its respective factor: Each transition error term represents a transition error at each time interval after a first time interval for each of the at least one factor exposure between the time interval and a prior time interval.

An additional embodiment of the present invention sets forth an article of manufacture including an information storage medium encoded with a computer-readable data structure adapted for use in evaluating over the Internet a performance of an asset collection. The data structure includes: one or more data fields with information related to a return of an asset collection for a plurality of time intervals in a period of time; one or more data fields with information related to each factor for the plurality of time intervals, each factor influencing the return of the asset collection; and at least one data field with information related to one or more factor exposures for the plurality of time intervals. Each factor exposure relays the influence of a respective factor on the return of the asset collection. The asset collection includes one or more assets. Each factor exposure at each time interval is determined by minimizing a value of an objective function while meeting at least one constraint on possible values for the at least one factor exposure. The objective function includes an estimation error term and one or more transition error terms. The estimation error term represents the estimation error at each time interval between the return of the asset collection and a sum of products of each of the at least one factor exposure and its respective factor. Each transition error term represents a transition error at each time interval after a first time interval for each of the at least one factor exposure between the time interval and a prior time interval.

Another additional embodiment of the present invention sets forth an article of manufacture including a propagated signal adapted for use in a method of estimating time-varying factor exposures at each time interval in a period of time, through a dynamic optimization of a model relating an influence of at least one factor on a return of an asset collection. The method includes the steps of: receiving data related to the return of the asset collection for the plurality of time intervals, the asset collection including at least one asset; receiving data related to the at least one factor for the plurality of time intervals; and for each of the plurality of time intervals; and determining at least one factor exposure minimizing a value of an objective function while meeting at least one constraint on possible values for the at least one factor exposure. The signal is encoded with machine-readable information relating to the asset collection. Each factor exposure relays the influence of a respective factor on the return of the asset collection. The objective function includes an estimation error term and one or more transition error terms. The estimation error term represents an estimation error at each time interval between the return of the asset collection and a sum of products of each of the at least one factor exposure and its respective factor. Each transition error term represents a transition error at each time interval after a first time interval for each of the at least one factor exposure between the time interval and a prior time interval.

DETAILED DESCRIPTION

1 A Solution for Dynamic Multi-Factor Problems in Finance

The present invention is described in relation to systems and methods for the resolution of the dynamic multi-factor RBSA problem in finance, but can be applied to any dynamic multi-factor financial or economic problem, in order to estimate the time-varying weights or factor exposures that model the behavior of any dependent financial or economic variable with independent variables over a period of time. In this detailed description, the dependent financial variable is the return of a single security or instrument, or the return of a portfolio of securities or instruments, or any function thereof.

However, in other embodiments, the dependent financial variable can be, for example, the price of a financial instrument or portfolio, a function of the price or return of the instrument or portfolio, or a function including a logarithm of the price or return of the instrument or portfolio. The independent variables may be any type of factor or index. The factors can be the prices or returns (or functions of prices or returns) of securities or classes of securities in a portfolio, securities or classes of securities not included in a portfolio, financial or economic indexes or other measurements that are asserted as influencing the behavior of the independent variable over the period of time, or any function thereof. The factor exposures discussed below are one type of weight that relays the influence of the independent variables on the dependent financial or economic variable in the model. The constraints set forth below can apply to one or more of the independent variables, as part of the model that is subject to the dynamic optimization process. The labels of variables in this application as dependent and independent variables are used for illustrative purposes only, in order to describe inputs to the model or problem, and do not imply or impart any statistical dependence or independence between any of these inputs.

1.1 The General Principle of Estimating Dynamic Multi-Factor Models

One embodiment sets forth the general principle to estimate time-varying factor exposures of either an individual financial instrument or a portfolio of such instruments described in equations (1) to (4) above, as a method that consists in solving a constrained multi-criteria dynamic optimization problem containing m+2 objective functions to be minimized, which are associated, respectively, with the estimation error vector and m+1 transition error vectors in certain norms:

$$\begin{cases} \min_{\substack{(\alpha_1,\ldots,\alpha_N)\\(\beta_1,\ldots,\beta_N)}} \|e_{[1,\ldots,N]}\|, \min_{(\alpha_1,\ldots,\alpha_N)} \|w_{0,[2,\ldots,N]}\|, \min_{(\beta_1,\ldots,\beta_N)} \|w_{1,[k_1+1,\ldots,N]}\|, \ldots, \min_{(\beta_1,\ldots,\beta_N)} \|w_{m,[k_m+1,\ldots,N]}\|, \\ e_{[1,\ldots,N]} = (e_t = y_t - \alpha_t - x_t^T \beta_t, t = 1, \ldots, N) \text{ (}N\text{-dimensional vector of estimation errors)}, \\ w_{0,[2,\ldots,N]} = (w_{0,t} = |\alpha_t - \alpha_{t-1}|, t = 1, \ldots, N) \\ w_{j,[k_j+1,\ldots,N]} = (w_{j,t} = \|\beta_t - \tilde{\beta}_t\|, t = k_j + 1, \ldots, N), \\ j = 1, \ldots, m \\ \tilde{\beta}_{j,t} = f_j(x_t, \ldots, x_{t-k_j}; \beta_{t-1}, \ldots, \beta_{t-k_j}) \text{ (transition equations)}, \\ \|e_{[1,\ldots,N]}\|, \|w_{j,[k_j+1,\ldots,N]}\| \text{ and } \|\beta_t^{(i)} - \tilde{\beta}_t^{(i)}\| \text{ are norms of any kinds}, \end{cases}$$

Equation (10)

$(N\text{-dimensional vectors of transition errors})$, subject to constraints:

$$\begin{cases} G_t \bar{\beta}_t + b_t \geq 0 & \text{(inequality constraints),} \\ F_t \bar{\beta}_t + c_t = 0 & \text{(equality constraints), } \bar{\beta}_t = (\alpha_t, \beta_t). \end{cases} \quad (11)$$

Here: $y_t$ present the given return (performance) of an instrument portfolio during period or time interval t, or any transformation of them, for instance, logarithmic;

$\beta_t = (\beta_t^{(1)}, \ldots, \beta_t^{(n)})^T$ are unknown n-dimensional column vectors of factor exposures during period t;

$\alpha_t$ is the unknown scalar intercept term during period t;

$\bar{\beta}_t = (\alpha_t, \beta_t^T)^T = (\alpha_t, \beta_t^{(1)}, \ldots, \beta_t^{(n)})^T$ are extended (n+1)-dimensional vectors consisting of the factor exposures and intercept term.

$x_t = (x_t^{(1)}, \ldots, x_t^{(n)})^T$ are known n-dimensional column vectors during period t; in the RBSA model these are returns on generic indices, while in the APT models these represent changes in certain economic factors;

$\ddot{\beta}_{j,t} = f_j(x_t, \ldots, x_{t-k_j}; \beta_{t-1}, \ldots, \beta_{t-k_j})$ are n-dimensional column vectors $\ddot{\beta}_{j,t} = (\beta_{j,t}^{(1)}, \ldots, \beta_{j,t}^{(n)})^T$ of transitioned factor exposures during period t in accordance with a linear or nonlinear model of the hidden dynamics of time-varying factor exposures; each criterion j=1, ..., m corresponds to a specific assumption on the dynamics model expressed by the choice of the respective function $f_j(x_t, \ldots, x_{t-k_j}; \beta_{t-1}, \ldots, \beta_{t-k_j})$.

$G_t \bar{\beta}_t + h_t \geq 0$, $G_t [l \times (n+1)]$, $h_t(l)$, are l time varying inequality constraints that represent prior information about coefficients of the model, for example non-negativity of exposures in the style analysis model (4) or hedging constraints in (20) further in the text;

$F_t \bar{\beta}_t + c_t 0$, $F_t [p \times (n+1)]$, $c_t(p)$, are p general linear equality constraints that represent certain knowledge about the structure of the parameters, for example, the budget constraint $$\sum_{i=1}^{n} \beta_t^{(i)} = 1$$

in the style analysis model (4).

1.2 Optimization Problem Formulation.

The model presented in Section 1.1 above, can be formulated as set forth below.

1.2.1. Criteria in the General Multi-Objective Principle of Estimating Time-Varying Factor Exposures.

In this embodiment, the elementary criteria in the general multi-objective principle of estimating time-varying factor exposures from (10), can be expressed as follows:

1) The squared Euclidean norm for estimation error vector $e_{[1, \ldots, N]} = (e_1, \ldots, e_N)$ representing the errors of fit $$\|e_{[1,\ldots,N]}\| = \sum_{t=1}^{N} e_t^2, \, e_t = y_t - \alpha_t - x_t^T \beta_t. \quad (12)$$

2) The squared Euclidean norms for transition error vectors of the intercept term $$w_{0,[2,\ldots,N]} = (w_{0,1}, \ldots, w_{0,N}), w_{0,t} = (\alpha_t - \alpha_{t-1})^2,$$

and factor exposures $w_{j,[k_j+1,\ldots,N]} = (w_{j,k_j+1}, \ldots, w_{j,N})$ $$\|w_{j,[k_j+1,\ldots,N]}\|^2 = \sum_{t=k_j+1}^{N} w_{j,t}^2, \quad (13)$$

$$w_{j,t} = [(\beta_t - \ddot{\beta}_t)^T U_{j,t} (\beta_t - \ddot{\beta}_t)]^{1/2}$$

between the actual values of factor exposures $\beta_t$ and transitioned values $$\ddot{\beta}_t = V_{j,1} \beta_{t-1} + \ldots + V_{j,k_j} \beta_{t-k_j} \quad (14)$$

in accordance with a linear model of the dynamics of time-varying factor exposures; each criterion j=1, ..., m corresponds to a specific assumption on the linear model defined by the choice of transition matrices $V_{j,1}, \ldots, V_{j,k_j}$; the positive semi-definite matrices $U_{j,t}$ (n×n) are defined to a) provide a proper unit scaling between the transition error $$w_{j,t} = \left[ \sum_{i=1}^{n} \sum_{l=1}^{n} u_{j,t}^{(il)} (\beta_t^{(i)} - \ddot{\beta}_{j,t}^{(i)})(\beta_t^{(l)} - \ddot{\beta}_{j,t}^{(l)}) \right]^{1/2} \quad (13)$$

and the fit error $e_t$ (12), and b) to individually (per factor) adjust transition errors. Unit scaling is desirable in multi-criteria optimizations because it provides common measurement units for all criteria. In our multi-criteria model, the transition errors are proportional to squared exposure deviations, while the fit errors are also proportional to squared factor changes. However, other norms (e.g., deviations or squared deviations) and other scaling can be used in multi-criteria models for the transition errors and fit errors in additional embodiments of the present invention.

In most cases it is sufficient to define matrix $U=\text{diag}(X^T X)$, where X is the N×n matrix of N factor raw-vectors $x_t^T = (x_t^{(1)}, \ldots, x_t^{(n)})$.

The number of transition equations m depends on the amount of a priori information known about the financial instrument (or portfolio) y that is being analyzed. For example, the requirement of exposure paths to be smooth and at the same time at the end of each quarter to revert to a certain (same) value may result in two transition criteria.

1.2.2. General Quadratic Optimization Problem.

In one embodiment, a method of multi-criteria estimating factor exposures for Euclidean norms of fit (12) and transition errors (13) under the linear model of the dynamics of factor exposures (14) includes solving the following quadratic programming problem, i.e. a quadratic optimization problem under linear equality and inequality constraints, formed as a linear combination of elementary quadratic criteria into a combined quadratic criterion with m free dimensionless coefficients $\lambda_0 \geq 0, \lambda_1 \geq 0, \ldots, \lambda_m \geq 0$ under constraints (11):

$$\begin{cases} \min_{\substack{\alpha_1,\ldots,\alpha_N \\ \beta_1,\ldots,\beta_N}} \left[ \sum_{t=1}^{N} (y_t - \alpha_t - x_t^T \beta_t)^2 + \lambda_0 \sum_{t=2}^{N} (\alpha_t - \alpha_{t-1})^2 + \lambda_1 \sum_{t=k_1+1}^{N} (\beta_t - \bar{\beta}_{1,t})^T U_{1,t} (\beta_t - \bar{\beta}_{1,t}) + \ldots + \right. \\ \left. \lambda_m \sum_{t=k_m+1}^{N} (\beta_t - \bar{\beta}_{m,t})^T U_{m,t} (\beta_t - \bar{\beta}_{m,t}) \right], \bar{\beta}_{j,t} = V_{j,1}\beta_{t-1} + \ldots + V_{j,k_j}\beta_{t-k_j}, j = 1, \ldots, m, \\ \text{subject to } G_t \bar{\beta}_t + h_t \geq 0, F_t \bar{\beta}_t + c_t = 0, t = 1, \ldots, N. \end{cases} \quad (15)$$

The objective function is quadratic $\min[\tilde{\beta}^T \tilde{Q} \tilde{\beta} + \tilde{q}^T \tilde{\beta} + b]$ with respect to the combined $(n+1)N$-dimensional variable $\tilde{\beta} = (\bar{\beta}_1^T, \ldots, \bar{\beta}_N^T)^T$, where matrix $\tilde{Q}$ $[(n+1)N \times (n+1)N]$ and vector $\tilde{q}$ $(n+1)N$ are built from blocks that depend on the given time series $(y_t, x_t)$, $t=1, \ldots, N$, and the parameters of the method, namely, matrices $U_{j,s}$, $V_{j,t}$, $j=1, \ldots, m$, $t=1, \ldots, N$, and weighting coefficients $\lambda_j$, $j=0, 1, \ldots, m$. Analogously, the N inequality constraints and N equality ones in (15) will be expressed, with respect to the combined variable $\tilde{\beta} = (\bar{\beta}_1^T, \ldots, \bar{\beta}_N^T)^T$, by two equivalent constraints $\tilde{G}\tilde{\beta} + \tilde{h} \geq 0$, $\tilde{F}\tilde{\beta} + \tilde{c} = 0$, where matrices $\tilde{G}$ $[l \times (n+1)N]$, $\tilde{F}$ $[p \times (n+1)N]$, and vectors $\tilde{h}$ $(l)$, $\tilde{c}$ $(p)$ consist of blocks, respectively, $G_t[l \times (n+1)]$, $F_t[p \times (n+1)]$, $h_t(l)$ and $c_t(p)$.

Such a quadratic problem $$\begin{cases} \min_{\tilde{\beta}} [\tilde{\beta}^T \tilde{Q} \tilde{\beta} + \tilde{q}^T \tilde{\beta} + b] \\ \text{subject to} \\ \tilde{G}\tilde{\beta} + \tilde{h} \geq 0, \\ \tilde{F}\tilde{\beta} + \tilde{c} = 0 \end{cases}$$

can be solved by any standard quadratic programming procedure (a procedure of quadratic optimization under linear equality and inequality constraints), for instance, based on an interior point method which is very efficient in solving large problems (described, for example, in Wright, S., *Primal-dual interior-point methods. SIAM*, 1997).

1.2.3. Specific Quadratic Optimization Problem.

In another embodiment, a method of estimating the time-varying factor exposures in the constrained dynamic RBSA problem (7) includes solving the following quadratic programming problem:

$$\begin{cases} \min_{\substack{\alpha_1,\ldots,\alpha_N \\ \beta_1,\ldots,\beta_N}} \left[ \sum_{t=1}^{N} (y_t - \alpha_t - x_t^T \beta_t)^2 + \lambda_0 (\alpha_t - \alpha_{t-1})^2 + \lambda_1 \sum_{t=2}^{N} (\beta_t - V_t \beta_{t-1})^T U_t (\beta_t - V_t \beta_{t-1}) \right], \\ \lambda_0 > 0, \lambda_1 > 0, \\ \text{subject to } \sum_{i=1}^{n} \beta_t^{(i)} = 1 \text{ (budget constraint)}, \beta_t^{(i)} \geq 0 \text{ (nonnegativity bounds)}. \end{cases} \quad (16)$$

This formulation of the problem is a special case of (15) and, the solution can processed by any standard quadratic programming procedure.

The coefficients $\lambda_0$ and $\lambda_1$ are responsible for smoothness of, respectively, the intercept term $\alpha_t$ and factor exposures $\beta_t$. The larger the values of these coefficients, the more weight is attached to the respective penalty term, the smoother the solution. For example, if $\lambda_0 \to \infty$ and $\lambda_1 \to \infty$, the solution of (16) becomes very smooth and approaches a least squares solution over the entire range of observations, while selecting $\lambda_0$ and $\lambda_1$ close to zero makes the paths $\alpha_t$ and $\beta_t = (\beta_t^{(1)}, \ldots, \beta_t^{(n)})^T$ very volatile.

Note that the role of each $\lambda$ in (16) is similar to the role of the moving window size described in the "BACKGROUND OF THE INVENTION" section above, namely, the wider the moving window, the smoother are the obtained paths of the respective time varying model parameter. The extreme case is when the window coincides with the whole date range, when both methods produce the same least squares solution (5).

The sequence of positive semi-definite matrices $(U_2, \ldots, U_N)$ plays the role of additional free parameters of the data model that provide a) a priori information about the relative smoothness of factor exposure vectors $\beta_t = (\beta_t^{(1)}, \ldots, \beta_t^{(n)})$ as a whole at each pair of adjacent time moments $(t-1, t)$ the difference of the required smoothness of individual exposure coefficients $\beta_t^{(i)}$.

In most cases, it can be enough to choose diagonal matrices $U_t = \text{Diag}(u_t^{(i)} \geq 0, i=1, \ldots, n)$ as defined in section 1.2.1. The greater $u_t^{(i)}$, the more smooth the sought-for coefficient $\beta_t^{(i)}$ is assumed to be at $(t-1, t)$. For example, setting value $u_t^{(i)}=0$ is equivalent to the assumption that $\beta_t^{(i)}$ undergoes a structural break at this point of time.

1.2.4. Nonlinear Transition Terms.

When factors in the model (10) represent financial assets (financial instruments, market indices, etc.) the transition errors (13) $w_{j,[2,\ldots,N]} = (w_{j,1}, \ldots, w_{j,N})$ include changes in exposures to these factors induced by the market. For example, if market value of a factor index in the model (10) changes dramatically during a single time period as compared to other model factors, then the relative value of exposure to this index has to undergo a similar change, and, therefore, non-smoothness of the exposure in this time period is not only normal, but is essential. At the same time, quadratic penalty term in model (15) corresponding to the transition errors on this factor is smoothing the exposure path. A way to remove such factor-induced drift from the transition errors is described below.

The following nonlinear transition equation is applied to (15):

$$f(x_{t-1}, \ldots, x_{t-k}; \beta_{t-1}, \ldots, \beta_{t-k}) = V(\beta_{t-1}, x_{t-1}) x_{t-1} \quad (17)$$

where the variable- and data-dependent matrix $V(\beta_{t-1}, x_{t-1})$ $(n \times n)$ is diagonal $$V(\beta_{t-1}, x_{t-1}) = \text{Diag}[v_t^{(i)}(\beta_{t-1}, x_{t-1}), i=1, \ldots, n], \quad (18)$$

$$v_t^{(i)}(\beta_{t-1}, x_{t-1}) = \frac{1 + x_{t-1}^{(i)}}{\sum_{l=1}^{n} \beta_{t-1}^{(l)} (1 + x_{t-1}^{(l)})}.$$

In Equation (18), the term on the right-hand side of the last equality represents the relative weight of each of the index/factor exposures in the effective mix induced by the change in corresponding index/factor over period t. Note that the scaling factor in denominator is required to satisfy the budget constraint $$\sum_{l=1}^{n} \beta_{t-1}^{(l)}(1 + x_{t-1}^{(l)}) = 1 + \sum_{l=1}^{n} \beta_{t-1}^{(l)} x_{t-1}^{(l)}.$$

As a result of the presence of nonlinear transition equation (17), the objective function is no longer quadratic, and the optimization problem is no longer a quadratic programming problem. For example, the objective function in the problem (15) with m=1 and $f_1(x_{t-1}, \ldots, x_{t-k}; \beta_{t-1}, \ldots, \beta_{t-k}) = V(\beta_{t-1}, x_{t-1})x_{t-1}$ will be transformed as follows:

$$\min_{\substack{\alpha_1,\ldots,\alpha_N \\ \beta_1,\ldots,\beta_N}} \left[ \sum_{t=1}^{N}(y_t - \alpha_t - x_t^T\beta_t)^2 + \lambda_0 \sum_{t=2}^{N}(\alpha_t - \alpha_{t-1})^2 + \right. \quad (19)$$

$$\left. \lambda_1 \sum_{t=2}^{N}(\beta_t - V(\beta_{t-1}, x_{t-1})\beta_{t-1})^T U_t(\beta_t - V(\beta_{t-1}, x_{t-1})\beta_{t-1}) \right],$$

$$V(\beta_{t-1}, x_{t-1}) = \text{Diag}\left(\frac{1 + x_{t-1}^{(i)}}{1 + x_{t-1}^T \beta_{t-1}}, i = 1, \ldots, n\right).$$

1.3 New Constraints for the RBSA Model.

In one embodiment, the RBSA method (16) can be extended by suggesting the following general constraints which account for more complex a priori information about portfolio/instrument structure (for example, short-selling, hedging, leveraging):

$$\sum_{i \in \Omega} \beta_t^{(i)} = 1 \text{ (optional budget constraint for a subset} \quad (20)$$

of the full set of factors $\Omega \subset \{1, \ldots, n\}$), $g_t^{(i)} \leq \beta_t^{(i)} \leq h_t^{(i)}$ (optional individual bounds), $$-H_t \sum_{k \in B} \beta_t^{(k)} \omega_t^{(k)} \leq \sum_{i \in A} \beta_t^{(i)} \omega_t^{(i)} \leq -L_t \sum_{k \in B} \beta_t^{(k)} \omega_t^{(k)},$$

$B \subset \{1, \ldots, n\}, A \subset \{1, \ldots, n\}$ (optional hedging), $$\sum_{i \in \Phi} \min(\beta_t^{(i)}, 0) \geq -S_t,$$

$\Phi \subset \{1, \ldots, n\}$ (optional short – selling leveraging).

Here:

A budget constraint can be specified only for a subset of $|\Omega|=n'<n$ indices, where $|\Omega|$ is the number of elements in the respective finite set. For example, the rest of the assets could be hedging instruments (currency forward rates).

The hedging constraint is interpreted as follows: a portfolio of hedging instruments $B \subset \{1, \ldots, n\}$ (a subset of all assets $|B| \leq n$) is hedging a portfolio $A \subset \{1, \ldots, n\}$, $|A| \leq n$, with a hedge ratio within time varying interval $(H_t, L_t)$. Known parameters $\omega_t^{(i)}$ define the known proportion between assets in the hedging portfolio and hedged portfolio. Unless these weights are known, typically they would be set to 1. In the simplest case, for example, the hedging portfolio contains one element—the currency return index in US dollar, and the hedged portfolio represents several generic indices (fixed-income, equity, etc.) in US dollar. Note that there could be several hedging constraints depending on the number of hedging relationships in the overall portfolio.

1.4 Numerical Solution.

Once the dynamic optimization problem is formulated, as set forth, for example, in Equation (15), the numerical solution can be obtained by processing the optimization problem in a variety of ways, as set forth below.

1.4.1. General Method to Solve an RBSA Problem (15).

In one embodiment, one general method of solving the RBSA problem, as formulated in Equation (15), includes programming a processor to use a quadratic programming algorithm in order to solve the problem.

1.4.2. Specific Method to Solve an RBSA Problem (15).

In another embodiment, the processor can be programmed with an interior point algorithm (e.g., the algorithm described in Wright, S., *Primal-dual interior-point methods, SIAM*, 1997), in order to solve the RBSA problem, as formulated in Equation (15) above.

1.4.3. Alternative Method of Solving a General Problem with Constraints (15).

In another embodiment, a processor can be programmed to implement the following steps in order to solve the RBSA problem, as formulated in Equation (15) above, in a more efficient manner.

Step 1. Determine whether constraints can be dropped. For example, a model (15) that includes only equality constraints $F_t\ddot{\beta}_t+c_1=0$, in particular, the budget one $$\sum_{i=1}^{n} \beta_t^{(i)} = 1,$$

can be converted to an equivalent unconstrained model, like (8), but containing variables vectors of lesser dimensionality $\dot{\beta}_t=(\beta_t^1, \ldots, \beta_t^{n-p})$ where p is the number of equality constraints. For instance, the budget constraint $$\sum_{i=1}^{n} \beta_t^{(i)} = 1$$

can be observed by setting $$\beta_t^{(n)} = 1 - \sum_{i=1}^{n-1} \beta_t^{(i)}$$

and solving the resulting unconstrained problem with respect to the remaining n−1 factor exposures $\dot{\beta}_t=(\beta_t^{(1)}, \ldots, \beta_t^{(n-1)})$.

A model without constraints with a single transition equation for any t $$\beta_t \cong V\beta_{t-1} \quad (21)$$

is equivalent to the FLS model (8) and can be solved by the recursive FLS algorithm, which is an algorithm of unconstrained quadratic optimization.

An unconstrained model with two transition equations $$\beta_t \cong V_{1,1}\beta_{t-1}+\ldots+V_{1,m}\beta_{t-m}, \beta_t \cong V_2\beta_{t-s} \quad (22)$$

is equivalent to the GFLS model (9) and can be solved by a recursive GFLS algorithm of unconstrained quadratic optimization.

Step 2. If optimization problem (15) can be solved by a recursive algorithm FLS or GFLS, the appropriate algorithm is then utilized by a processor to obtain the solution. If not, a quadratic programming solver (an algorithm of quadratic optimization under linear equality and inequality constraints) as mentioned above in Sections 1.2.2 and 1.2.3 is utilized by a processor to obtain the solution.

1.4.4. Iterative Algorithm for Solution of the Problem (16) Containing a Non-Quadratic Objective Function (19).

In one embodiment, an iterative algorithm can be used, based on the fact that the criterion (19) becomes quadratic, if the values $\beta_t^{(k)}$ in the denominator of the transition term are considered as predefined constants. A processor could be programmed with the following iterative algorithm, to obtain a solution on step q, the solution being denoted as $\beta_t(q)$:

Step 0. Obtain solution $\beta_t(0)$ of the quadratic programming problem with objective function (16).

Step q>0. Use the solution obtained on the previous step as a constant $\beta_t(q-1)$=const in the denominator of the scaling factor and solve the resulting quadratic programming problem:

$$\begin{pmatrix} \alpha_1(q), \ldots, \alpha_N(q) \\ \beta_1(q), \ldots, \beta_N(q) \end{pmatrix} = \underset{\substack{\alpha_1,\ldots,\alpha_N \\ \beta_1,\ldots,\beta_N}}{\operatorname{argmin}} \left[ \sum_{t=1}^{N} (y_t - \alpha_t - x_t^T \beta_t)^2 + \lambda_0 (\alpha_t - \alpha_{t-1})^2 + \lambda_1 \sum_{t=2}^{N} (\beta_t - V_t \beta_{t-1})^T U_t (\beta_t - V_t \beta_{t-1}) \right]$$

where $V_t$ are diagonal (n×n) matrices with $$v_{ii}^{(t)} = \frac{1 + x_{t-1}^{(i)}}{\sum_{i=1}^{n} [1 + \beta_{t-1}^{(i)}(q-1) x_{t-1}^{(i)}]}$$

The number of iterations can be fixed or determined by the convergence of consecutive iterations.

2 Determining Structural Breakpoints in Factor Exposures

In one embodiment, the following method can be used to determine structural changes in exposures in the model, presented in Equations (16)-(20).

The partial left and right objective functions for a certain point t are denoted as follows:

$$J_{[1,t]}(\bar{\beta}_1, \ldots, \bar{\beta}_t) = \sum_{s=1}^{t} (y_s - \alpha_s - x_s^T \beta_s)^2 + \lambda_0 \sum_{s=2}^{t} (\alpha_s - \alpha_{s-1})^2 + \lambda_1 \sum_{s=2}^{t} (\beta_s - V_s \beta_{s-1})^T U_s (\beta_s - V_s \beta_{s-1}),$$

$$J_{[t,N]}(\bar{\beta}_t, \ldots, \bar{\beta}_N) = \sum_{s=t}^{N} (y_s - \alpha_s - x_s^T \beta_s)^2 + \lambda_0 \sum_{s=t}^{N-1} (\alpha_{s+1} - \alpha_s)^2 +$$

-continued $$\lambda_1 \sum_{s=t}^{N-1} (\beta_{s+1} - V_{s+1} \beta_s)^T U_{s+1} (\beta_{s+1} - V_{s+1} \beta_s),$$

$$\bar{\beta}_t = (\beta_t^T, \alpha_t)^T = (\beta_t^{(1)}, \ldots, \beta_t^{(n)}, \alpha_t)^T,$$

where the second sum in both notations is considered as equal to zero if, respectively, t=1 and t=N−1.

The method is based on the separable property of the full objective function $J(\bar{\beta}_1, \ldots, \bar{\beta}_N) = J_{[1,N]}(\bar{\beta}_1, \ldots, \bar{\beta}_N)$ for any $t \in \{2, \ldots, N\}$:

$$J_{[1,N]}(\bar{\beta}_1, \ldots, \bar{\beta}_N) = J_{[1,t-1]}(\bar{\beta}_1, \ldots, \bar{\beta}_{t-1}) + J_{[t,N]}(\bar{\beta}_t, \ldots, \bar{\beta}_N) + \gamma_t(\bar{\beta}_{t-1}, \ldots, \bar{\beta}_t).$$

Here $$\gamma_t(\bar{\beta}_{t-1}, \ldots, \bar{\beta}_t) = \lambda_0 (\alpha_t - \alpha_{t-1})^2 + \lambda_1 (\beta_t - V_t \beta_{t-1})^T U_t (\beta_t - V_t \beta_{t-1})$$

denotes the transition term at the pair of adjacent points t−1 and t.

In this embodiment, the objective function is modified as follows:

$$J_{[1,N]}^{t,\mu}(\bar{\beta}_1, \ldots, \bar{\beta}_N) = J_{[1,t-1]}(\bar{\beta}_1, \ldots, \bar{\beta}_{t-1}) + J_{[t,N]}(\bar{\beta}_t, \ldots, \bar{\beta}_N) + \mu \gamma_t(\bar{\beta}_{t-1}, \ldots, \bar{\beta}_t),$$

where parameter $0 \leq \mu < 1$ reflects full removal $\mu=0$ or partial removal of the transition term corresponding to the point t. Since $$J_{[1,N]}^{t,\mu}(\bar{\beta}_1, \ldots, \bar{\beta}_N) < J_{[1,N]}(\bar{\beta}_1, \ldots, \bar{\beta}_N),$$

the following inequality is true:

$$\min_{\bar{\beta}_1, \ldots, \bar{\beta}_N} J_{[1,N]}^{t,\mu}(\bar{\beta}_1, \ldots, \bar{\beta}_N) \leq \min_{\bar{\beta}_1, \ldots, \bar{\beta}_N} J_{[1,N]}(\bar{\beta}_1, \ldots, \bar{\beta}_N).$$

The operation "min" here and below denotes the minimum of the objective function subject to the optional constraints in (15).

In this embodiment, the present invention sets forth a statistic, referred to herein as a Structural Breakpoint Ratio (SBR), indicating the presence of structural changes in factor exposures in the model (15):

$$\rho_t^\mu = \frac{\displaystyle\min_{\bar{\beta}_1, \ldots, \bar{\beta}_N} J_{[1,N]}(\bar{\beta}_1, \ldots, \bar{\beta}_N)}{\displaystyle\min_{\bar{\beta}_1, \ldots, \bar{\beta}_N} J_{[1,N]}^{t,\mu}(\bar{\beta}_1, \ldots, \bar{\beta}_N)}, t \in \{2, \ldots, N\}. \quad (23)$$

A visual or analytical analysis of SBR values can be used to determine one or several possible breakpoints. Specifically, the pair of adjacent points (t*−1, t*) in the interval t*∈ {2, . . . , N} is considered to be the point of a possible structural break if $$t^* = \underset{t \in \{2, \ldots, N\}}{\operatorname{argmax}} \rho_t^\mu.$$

In addition, a certain threshold h>1 can be used to detect a real structural shift as follows:

$$t^* = \underset{t \in \{2, \ldots, N\} : \rho_t^\mu > h}{\operatorname{argmax}} \rho_t^\mu. \quad (24)$$

If the condition $\rho_t^\mu > h$ is not met at any time moment, then there are no breakpoints in the succession of factor exposures.

The above described methodology and the SBR statistic can be used for any model (15) with any transition equations that allow the objective function to be separable, for example, having m=1.

3 Measuring Solution Adequacy, Determining Optimal Model Parameters

The optimization problem (15) that provides solution to the general model (10,11) contains m+1 free parameters $\lambda_0$, $\lambda_1, \ldots, \lambda_m$ and therefore, allows for an infinite number of solutions. Typically, researchers have presented solutions of a large number of optimizations for various values of parameters, where such parameters belong to an (m+1)-dimensional grid. The results, being actually the time paths for various values of $\alpha_t$ and $\beta_t$, t=1, ..., N, are then visually evaluated for consistency. For example, in Lütkepohl, H., Herwartz, H., *Specification of varying coefficient time series models via generalized flexible least squares*. Journal of Econometrics, 70, 1996, pp. 261-290), in the case when m=1 and the constraints are absent, the authors take the discrete values of the parameter $\lambda=10^{-3}$, $\lambda=1$, $\lambda=10^3$.

Below, the present invention sets forth an embodiment including methods to measure portfolio adequacy and automatically select the most appropriate set of regressors (model selection) and the optimal value of parameters $\lambda$.

3.1 Cross Validation Statistic

In this embodiment, a Cross Validation (CV) of a model is used to evaluate the ability of a model to predict (forecast). For the purpose of cross validation, the available observation data sample is typically split into two sets, the estimation set and the test set. The model is then evaluated on the former set and tested on the latter one. For the purpose of such test, a certain statistic, a loss function, is being calculated based on the prediction errors in a predefined metric.

A validation statistic $Q_{CV}$ for the general model (9) can be computed as follows:

Step 1. For each $t \in \{1, \ldots, N\}$, obtain a solution $(\hat{\bar{\beta}}_t^{(t)}, t=1,\ldots,N)$, $\hat{\bar{\beta}}_t^{(t)} = (\hat{\beta}_t^{(t,1)}, \ldots, \hat{\beta}_t^{(t,n)}, \hat{\alpha}_t^{(t)})^T$, for a reduced optimization problem with estimation equation corresponding to the return $y_t$ at point t removed $\{y_1, \ldots, y_{t-1}, y_{t+1}, \ldots, y_N\}$.

Step 2. For each $t \in \{1, \ldots, N\}$, compute a prediction $\hat{y}_t^{(t)}$ of the removed instrument/portfolio return $y_t$ as the sum of the intercept term and the weighted average of index (factor) returns $$\hat{y}_t^{(t)} = \alpha_t^{(t)} + x_t^T \hat{\beta}_t^{(t)} = \alpha_t^{(t)} + \sum_{i=1}^n \hat{\beta}_t^{(t,i)} x_t^{(i)}$$

with the parameters $\alpha_t^{(t)}$ and $\hat{\beta}_t^{(t,i)}$ computed on Step 1.

Step 3. Compute the cross validation statistic $Q_{CV}$ as the estimate of the distance between the return vector y and predicted return vector $\hat{y}^{(t)}$ in a certain norm $Q_{CV} = \|\hat{e}_1^{(1)}, \ldots, \hat{e}_N^{(N)}\|$, $\hat{e}_t^{(t)} = y_t - \hat{y}_t^{(t)}$.

For example, for the quadratic problem (15), the cross validation statistic $Q_{CV}$, can be defined as follows:

$$J^{(t)}(\bar{\beta}_1, \ldots, \bar{\beta}_N) = \sum_{s=1, s \neq t}^N (y_s - \alpha_s - x_s^T \beta_s)^2 + \quad (25)$$

-continued $$\lambda_0 \sum_{s=2}^N (\alpha_s - \alpha_{s-1})^2 + \lambda_1 \sum_{s=2}^N (\beta_s - V_s \beta_{s-1})^T U_s (\beta_s - V_s \beta_{s-1}),$$

$$(\hat{\bar{\beta}}_1^{(t)}, \ldots, \hat{\bar{\beta}}_N^{(t)}) = \underset{(\beta_1, \ldots, \beta_N)}{\operatorname{argmin}} J^{(t)}(\bar{\beta}_1, \ldots, \bar{\beta}_N)$$

subject to general constraints (12);

$\hat{y}_t^{(t)} = \alpha_t^{(t)} + x_t^T \hat{\beta}_t^{(t)}$ (prediction), $\hat{e}_t^{(t)} = y_t - \hat{y}_t^{(t)}$ (prediction error), $Q_{CV} = \|\hat{e}_{[1,N]}^{(t)}\|$.

For example, the quadratic norm can be used $$Q_{CV,sq} = \|\hat{e}_1^{(1)}, \ldots, \hat{e}_N^{(N)}\|_{sq}^2 = \frac{1}{N} \sum_{t=1}^N (y_t - \hat{y}_t^{(t)})^2, \quad (26)$$

or the sum of absolute values of components $$Q_{CV,abs} = \|\hat{e}_1^{(1)}, \ldots, \hat{e}_N^{(N)}\|_{abs} = \frac{1}{N} \sum_{t=1}^N |y_t - \hat{y}_t^{(t)}|. \quad (27)$$

The statistics (26) and (27) can be further scaled to make them comparable across different analyzed portfolios or instruments.

In another embodiment, the cross validation statistic can be measured as the Predicted R-Squared Statistic $PR^2$ $$PR^2 = 1 - \frac{Q_{CV,sq}}{Var_{sq}(y)}, \quad Var_{sq}(y) = \frac{1}{N} \sum_{t=1}^N (y_t - \bar{y})^2, \quad (28)$$

and the Predicted R-Statistic PR $$PR = 1 - \frac{\|\hat{e}_1^{(1)}, \ldots, \hat{e}_N^{(N)}\|_{abs}}{\|y_1 - \bar{y}, \ldots, y_N - \bar{y}\|_{abs}}. \quad (29)$$

Note that (28) is computed similar to the regression R-squared statistic.

3.2 Using CV in Parameter Selection

Note that the cross validation statistic $Q_{CV}$ discussed above is a function of the parameter vector $Q_{CV} = Q_{CV}(\lambda)$, $\lambda = (\lambda_0, \lambda_1, \ldots, \lambda_m)$. Choosing a different parameter vector $\lambda$ for the objective function (15) results, in general, in different solutions, different predictions and, therefore, different prediction errors.

In one embodiment, the cross validation statistic described above can be used to determine optimal model parameters, by solving the following optimization problem:

$$\lambda_{opt} = \underset{\lambda}{\operatorname{argmin}} Q_{CV}(\lambda).$$

Such an optimal value of $\lambda$ would produce the minimal prediction error. Note that the selection of $\lambda$ through minimizing the prediction error makes it a version of the James- Stein estimator producing the smallest prediction error, for example, as described in Stone, M., *Cross-validatory choice and assessment of statistical predictions. Journal of Royal Statistical Soc.*, B 36, 1974, pp. 111-133.

3.3 Using CV in Model Selection.

The following three methods can be used, either independently or in combination with each other, in order to obtain the optimal set of factors in the optimization problem (16,20) by using $Q_{CV}$ statistic defined in 3.1.

a) A solution of the optimization problem (16) and the $Q_{CV}$ statistic are computed for each subset $\Omega$ of n' factors. The optimal set of factors is chosen as one that results in the minimum value of $Q_{CV}(\Omega)$ across all such subsets:

$$\Omega_{opt} = \operatorname*{argmin}_{\Omega} Q_{CV}(\Omega).$$

b) Forward stepwise selection by adding factors one-by-one until no further improvement in the cross-validation measure is possible or a certain threshold $Q_{CV}$ statistic increment is met.

c) Backward stepwise selection by starting with all factors and removing factors one-by-one until further improvement in the cross-validation statistic is not possible or the threshold $Q_{CV}$ statistic increment value is met.

4. Additional Embodiments

The methodology set forth above provides an efficient manner for one or more processors housed in computer systems, such as in servers communicating with end-user terminals via an internet or intranet connection) to provide the end-user with information that most accurately estimates the time-varying factor exposures (or other weights) for factors (or other independent variables) in their model, by solving the constrained multi-factor dynamic optimization problem, determining structural breakpoints for the factor exposures or weights, and assisting the end-user determine how to model the behavior of the dependent financial or economic variable with the use of the cross validation statistic. The processors can be programmed with algorithms following the steps set forth above, retrieving data related to the independent variables and dependent financial or economic variables from datasets stored in databases that are housed in either the same computer system, or in a different computer system, communicating with the one or more processors in order to obtain the requested estimates.

The methodology can be programmed into a computer by being incorporated into computer readable program code embodied in a computer usable medium (e.g., a disk), in order to create a computer program product that is used to evaluate the model for the dependent financial or economic variable. The information from the computer program product can be used to evaluate the performance of an asset collection based on the information generated from the model.

The methodology can be implemented in an article of manufacture that includes an information storage medium encoded with a computer-readable data structure adapted for use in evaluating the performance of an asset collection over the Internet or other connection. The data structure includes data fields with information relating to each aspect of the model or problem, such as, for example: information related to the return on the asset collection (or other dependent financial or economic variables) over the period of time; information related to the factors (or other independent variables) over the period of time; information related to the factor exposures (or weights for the independent variables) over the period of time, determined through the solution of the constrained multi-factor dynamic optimization problem; information related to the structural breakpoint ratios for the factor exposures or weights; and information related to the cross validation statistic of the model.

The article of manufacture can include a propagated signal adapted for use in a method of estimating time-varying factor exposures (or other weights) in the dynamic optimization model through the period of time. The method includes one or more of the principles, formulations and steps set forth above, and the signal is encoded with information relating to the various aspects of the model or problem.

The information generated by such dynamic optimization models or problems can be used, for example, to evaluate the performance of a mutual fund, the management of a portfolio or the sensitivity of a certain security or instrument or class of securities or instruments to various economic or financial indexes or indicators.

5. Conclusion

In the preceding specification, the present invention has been described with reference to specific exemplary embodiments thereof. Although many steps have been conveniently illustrated as described in a sequential manner, it will be appreciated that steps may be reordered or performed in parallel. It will further be evident that various modifications and changes may be made therewith without departing from the broader spirit and scope of the present invention as set forth in the claims that follow. The description is accordingly to be regarded in an illustrative rather than a restrictive sense.

What is claimed is:

1. A method for determining at least one factor exposure of an asset collection for each of a plurality of time intervals in a period of time, the asset collection including at least one asset, comprising:
   receiving performance data of the asset collection for the plurality of time intervals;
   receiving data related to at least one factor for the plurality of time intervals, the at least one factor influencing the performance data;
   for each of the plurality of time intervals, determining an objective function which includes an estimation error term and at least one transition error term, the estimation error term representing an estimation error at each time interval between the performance of the asset collection and a sum of products of each of the at least one factor exposure and its respective factor, the at least one transition error term representing a transition error at each time interval after a first time interval for each of the at least one factor exposure between the time interval and a prior time interval; and
   for each of the plurality of time intervals, determining the at least one factor exposure by optimizing a value of the objective function,
   wherein each of the step of determining the objective function and the step of determining the least one factor exposure is performed using at least one processor.

2. The method according to claim 1, wherein the performance data including at least one of (a) a price of the asset collection, (b) a return of the asset collection and (c) a function of at least one of the price and the return.

3. The method according to claim 1, further comprising:
   defining at least one constraint on the at least one factor exposure for at least one of the plurality of time intervals.

4. The method according to claim 3, wherein the at least one constraint is a bound constraint.

5. The method according to claim 3, wherein the at least one constraint is a general linear constraint relating to a structure of the factor exposures in at least one of the plurality of time intervals.

6. The method according to claim 5, wherein the general linear constraint is a budget constraint, the budget constraint requiring estimated factor exposures for a subset of factors in the model to sum to one, the subset including at least one of the factors.

7. The method according to claim 6, wherein the defining step includes the substeps of:
 establishing the budget constraint for the at least one exposure factor for a subset of the factors in the model,
 establishing the factors excluded from the subset as the factors representing the hedging instruments in the asset collection, and
 establishing a hedging constraint on the possible values of the factor exposures for a the factors in the subset of hedging instruments in relation to the factor exposures for at least one factor included in the in the budget constraint of the asset collection.

8. The method according to claim 5, wherein the general linear constraint is a budget constraint, the budget constraint requiring estimated factor exposures for all the factors to sum to one.

9. The method according to claim 1, wherein the determining the objective function step includes the substep of:
 formulating the objective function as a parameter-weighted sum, the parameter-weighted sum being a sum of a norm of the estimation error term and a parameter-weighted norm of each of the at least one transition error term.

10. The method according to claim 1, wherein the determining the objective function step includes the substep of:
 formulating the objective function as a parameter-weighted sum, the parameter-weighted sum being a sum of a quadratic norm of the estimation error term and a parameter-weighted quadratic norm of each of the at least one transition error term.

11. The method according to claim 10, wherein the determining step includes the substeps of:
 reformulating the objective function without the at least one constraint, the reformulated objective function without the at least one constraint being equivalent to the objective function with the at least one constraint and
 determining the at least one factor exposure by minimizing the value of the reformulated objective function using one of a Flexible Least Squares function and a Generalized Flexible Least Squares function.

12. The method according to claim 1, further comprising:
 determining a cross validation statistic of the model by testing an accuracy of a predicted performance of the asset collection for at least one of the plurality of time intervals.

13. The method according to claim 12, wherein the testing step includes the step of:
 calculating a prediction error of the performance of the asset collection at each tested time interval as a difference between an actual performance of the asset collection and a predicted performance of the asset collection at the tested time interval,
 wherein the predicted performance of the asset collection at each tested time interval is determined as a function of predicted factor exposures and their respective factors at the tested time interval.

14. The method according to claim 13, wherein the step of determining the predicted performance includes the substeps of:
 (A) creating, for each tested time interval, a reduced dataset to determine the predicted performance of the asset collection at the tested time interval, the reduced dataset excluding information relating to the actual performance of the asset collection at the tested time interval, and
 (B) determining, with the reduced dataset for the tested time interval, the predicted factor exposures minimizing the value of the objective function.

15. The method according to claim 12, further comprising:
 determining a value of a parameter, weighting the norm of at least one transition error term in the parameter-weighted sum, as a function of the cross validation statistic of the model,
 wherein the parameter-weighted sum is one of (a) a sum of a norm of the estimation error term and a parameter-weighted norm of each of the at least one transition error term and (b) a sum of a quadratic norm of the estimation error term and a parameter-weighted quadratic norm of each of the at least one transition error term.

16. The method according to claim 12, further comprising:
 selecting the at least one factor of the model as a function of the cross validation statistic of the model.

17. The method according to claim 1, wherein the step of determining the objective function includes the substep of:
 formulating the at least one transition error term as a function determining, at each time interval, a difference between a value of an estimated factor exposure for its respective factor at the time interval, and a value of the factor exposure induced by a change in the respective factor between the time interval and a prior time interval.

18. The method according to claim 1, further comprising:
 selecting one of a security and a portfolio of securities as the asset collection for the model.

19. A method for determining at least one factor exposure of an asset collection for each of a plurality of time interval in a period of time, comprising:
 (A) receiving performance data of the asset collection for the plurality of time intervals, the asset collection including at least one asset;
 (B) receiving data related to at least one factor for the plurality of time intervals, the at least one factor influencing the return;
 (C) for each of the plurality of time intervals, determining an objective function, the objective function including an estimation error term and at least one transition error term, the estimation error term representing an estimation error at each time interval between the performance of the asset collection and a sum of products of each of the at least one factor exposure and its respective factor, the at least one transition error term representing a transition error at each time interval after a first time interval for each of the at least one factor exposure between the time interval and a prior time interval, wherein the step (C) includes the substep of formulating the objective function as a parameter-weighted sum, the parameter-weighted sum being a sum of a quadratic norm of the estimation error term and a parameter-weighted quadratic norm of each of the at least one transition error term;

(D) for each of the plurality of time intervals, determining the at least one factor exposure by optimizing a value of the objective function; and (E) determining a cross validation statistic of the model by testing an accuracy of a predicted performance of the asset collection at each time interval, the testing step includes the substep of calculating a prediction error of the performance of the asset collection at each tested time interval as a difference between an actual performance of the asset collection and a predicted performance of the asset collection at the tested time interval, wherein the (E) step includes the substep of calculating a quadratic norm of all the prediction errors of the performance of the asset collection over the period of time, the substep of calculating the quadratic norm including the step of summing up over all tested time intervals the square of a difference between the actual performance of the asset collection and the predicted performance of the asset collection, and dividing the sum by a number of the tested time intervals in the period of time, and wherein each of the C, D and E steps is performed using at least one processor.

20. The method according to claim 19, further comprising the step of:

defining at least one constraint of the at least one factor exposure for at least one interval.

21. A computer readable storage medium including a set of instruction executable by a processor for determining at least one factor exposure of an asset collection for each of a plurality of time intervals in a period of time, the asset collection including at least one asset, the set of instructions operable to:

receiving performance data of the asset collection for the plurality of time intervals;

receiving data related to at least one factor for the plurality of time intervals, the at least one factor influencing the performance data;

for each of the plurality of time intervals, determining an objective function which includes an estimation error term and at least one transition error term, the estimation error term representing an estimation error at each time interval between the performance of the asset collection and a sum of products of each of the at least one factor exposure and its respective factor, the at least one transition error term representing a transition error at each time interval after a first time interval for each of the at least one factor exposure between the time interval and a prior time interval; and for each of the plurality of time intervals, determining the at least one factor exposure by optimizing a value of the objective function.

* * * * *